United States Patent [19]

Cooley

[11] 3,836,871
[45] Sept. 17, 1974

[54] LASER GLASS HOST COMPOSITIONS COMPRISING $TeO_2$, $Li_2O$ AND ZnO

[75] Inventor: Richard F. Cooley, Toledo, Ohio

[73] Assignee: Owens-Illinois, Inc., Toledo, Ohio

[22] Filed: June 27, 1973

[21] Appl. No.: 374,108

[52] U.S. Cl. ............................ 331/94.5, 252/301.4
[51] Int. Cl. .............................................. H01s 3/16
[58] Field of Search ..... 331/94.5; 252/301.4, 301.6; 106/47

[56] References Cited
UNITED STATES PATENTS
3,462,707  8/1969  Pearson et al. .................... 331/94.5

Primary Examiner—William L. Sikes
Attorney, Agent, or Firm—Richard D. Heberling; E. J. Holler

[57] ABSTRACT

Laser glass host compositions for effective lasing amounts of $Nd_2O_3$ are disclosed, the host compositions comprising $TeO_2$, $Li_2O$ and ZnO in certain molar amounts. Also disclosed are methods of making highly effective laser articles, such as rods, and also the new use of the above-described glass compositions for forming laser articles, the new use including forming laser articles from the compositions, pumping the resultant laser articles to provide an energy inversion, and lasing the pumped articles.

14 Claims, 1 Drawing Figure

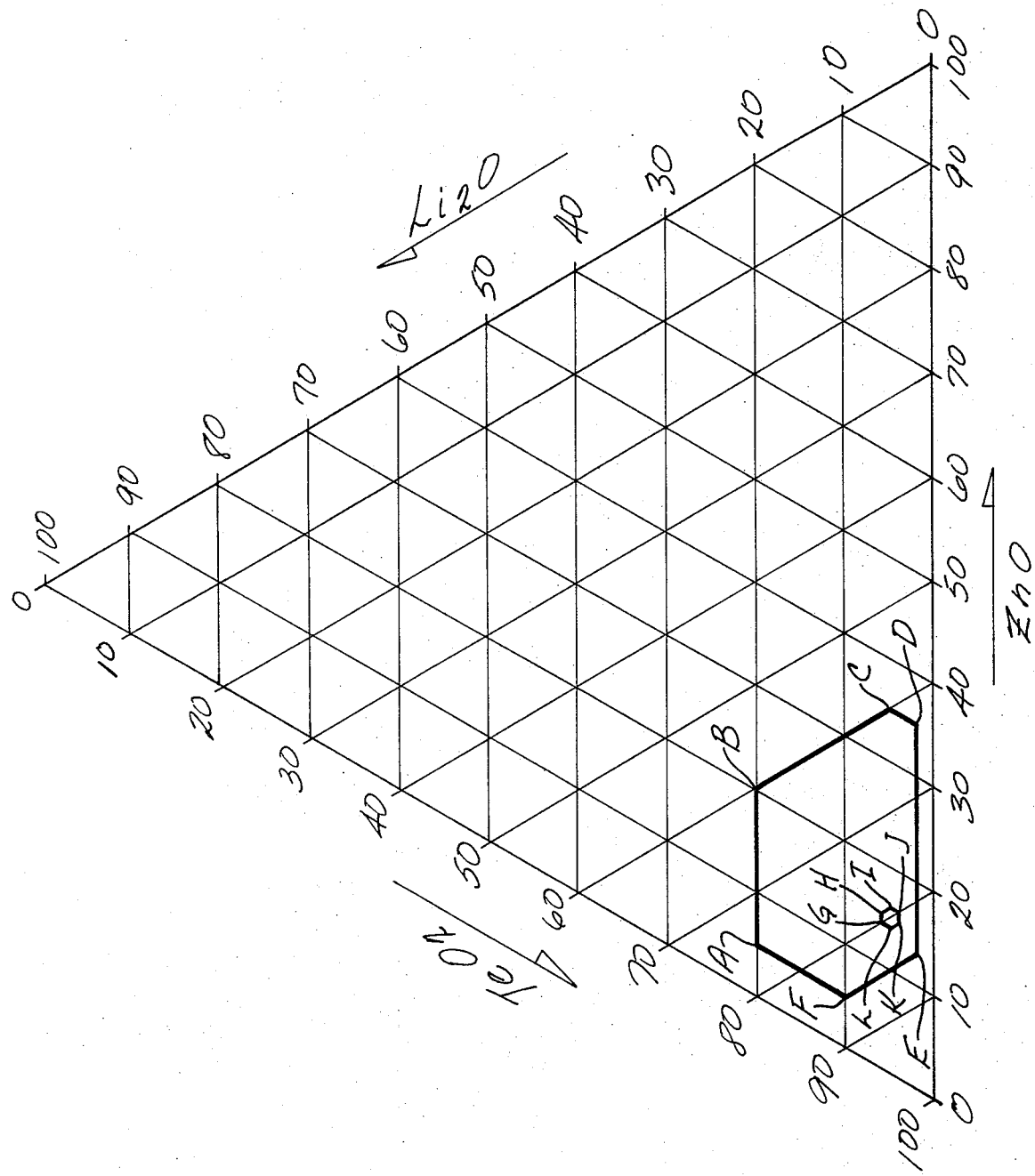

LASER GLASS HOST COMPOSITIONS COMPRISING TeO$_2$, Li$_2$O AND ZnO

INVENTION

The present invention relates to laser glass host compositions for effective lasing amounts of Nd$_2$O$_3$, the host compositions comprising TeO$_2$, Li$_2$O and ZnO. The present invention also relates to methods of making laser articles, such as laser rods, the methods including the steps of:

1. melting laser glass batch-forming materials to provide a glass composition comprising certain amounts of TeO$_2$, Li$_2$O and ZnO, the glass compositions being a host for an effective lasing amount of Nd$_2$O$_3$;
2. forming a glass laser blank from the molten glass; and
3. fabricating a laser article from the blank to provide a very efficient laser article.

The present invention also relates to the new use for TeO$_2$/Li$_2$O/ZnO glass compositions for making glass laser articles, in which the composition contains an effective amount of Nd$_2$O$_3$, the new use including the steps of:

1. forming laser articles from glass compositions comprising TeO$_2$, Li$_2$O and ZnO, the glass composition being a host for Nd$_2$O$_3$;
2. pumping the laser article to provide an energy inversion; and
3. lasing the pumped article.

The present invention also relates to outstanding glass laser articles, such as rods and discs, which are made from glass host compositions TeO$_2$, Li$_2$O and ZnO.

It is desirable to provide laser glass compositions that can be used to make outstanding, highly efficient glass laser articles. It is desirable also to provide methods of making the articles and to provide the new use for glass compositions comprising TeO$_2$, Li$_2$O and ZnO in which the new use includes the steps of:

1. forming a glass laser article from the above described glass composition that is a host for an effective lasing amount of Nd$_2$O$_3$;
2. pumping the laser article; and thereafter
3. lasing the pumped article.

It is an object of the present invention to provide a glass laser composition containing TeO$_2$, Li$_2$O and ZnO in which the molar proportions of TeO$_2$, Li$_2$O and ZnO are defined in a general range by the area within the heavy lines connecting the points ABCDEF in the ternary diagram of the FIGURE of the drawings, the glass composition also being a host for an effective lasing amount of Nd$_2$O$_3$.

It is an object of the present invention to provide a method for making a glass article, such as a laser rod, disc or the like, in which the method comprises the steps of:

1. melting laser glass batch-forming materials to provide a molten glass comprising TeO$_2$, Li$_2$O and ZnO in which the molar proportions thereof are defined by the area within the heavy lines connecting the points ABCDEF of the ternary diagram of the FIGURE, the glass also being a host for Nd$_2$O$_3$;
2. forming a glass laser blank from the molten glass; and
3. fabricating a laser article from the blank to provide a very efficient laser article.

It is an object of the present invention to provide the new use for a glass composition for making a glass laser article thereof in which the glass comprises TeO$_2$, Li$_2$O and ZnO in which the molar proportions thereof are defined in a general range by the area within the heavy lines connecting the points ABCDEF of the ternary diagram of the FIGURE, and in which the glass composition is a host for an effective lasing amount of Nd$_2$O$_3$, the new use comprising the steps of:

1. forming a glass laser article from the glass composition comprising TeO$_2$, Li$_2$O and ZnO along with an effective lasing amount of Nd$_2$O$_3$;
2. pumping the laser article to provide an energy inversion; and
3. lasing the pumped laser article.

It is an object of the present invention to provide an efficient glass laser article, such as a rod or disc, made from a glass composition comprising TeO$_2$, Li$_2$O and ZnO, the glass composition containing Nd$_2$O$_3$.

These and other objects will become apparent from the specification that follows, the appended claims, and the drawings, in which the FIGURE is a ternary diagram of the glass host composition of the present invention in which the molar proportions of TeO$_2$, Li$_2$O and ZnO are defined by the area within the heavy lines of the ternary diagram.

The present invention provides outstanding laser glass host compositions for effective lasing amounts of Nd$_2$O$_3$, the host compositions comprising TeO$_2$, Li$_2$O and ZnO in certain molar amounts that are defined generally by the area within the heavy lines connecting the points ABCDEF of the ternary diagram of the FIGURE of the drawings. Preferably, the molar amounts of TeO$_2$, Li$_2$O and ZnO are defined by the area within the heavy lines connecting the points GHIJKL in the ternary diagram.

The present invention also provides methods for making highly efficient glass laser articles, such as rods or discs, the methods comprising the steps of:

1. melting laser glass batch-forming materials to provide a molten glass comprising TeO$_2$, Li$_2$O and ZnO in which the molar amounts thereof are defined in a general range by the area within the heavy lines connecting the points ABCDEF of the ternary diagram, the molten glass being a host for an effective lasing amount of Nd$_2$O$_3$;
2. forming a glass laser blank from the molten glass; and
3. fabricating the outstanding laser article from the blank.

The present invention also provides the new use for a glass composition as a glass laser article in which the glass comprises TeO$_2$, Li$_2$O and ZnO in which the molar proportions thereof are defined in a general range within the area formed by the heavy lines connecting points ABCDEF of the ternary diagram, the glass being a host for an effective lasing amount of Nd$_2$O$_3$, the new use comprising the steps of:

1. forming a glass laser article from the glass composition;
2. pumping the laser article to provide an energy inversion; and
3. lasing the pumped laser article.

A zinc tellurite glass consisting essentially of a major molar proportion of TeO$_2$, and between about 20 and 40 molar percent of ZnO is described and claimed in the Redman U. S. Pat. No. 3,423,326. These zinc tellurite glasses were reported as having some fluorescent activity when doped with $Nd_2O_3$. As previously indicated, the outstanding laser glass host compositions of the present invention exhibit much higher fluorescent activity than the zinc tellurite glasses of the Redman patent, the increased fluorescent activity indicating a greater lasing efficiency for laser articles made from the host compositions of the present invention. As previously described, only certain molar proportions of $TeO_2$, $Li_2O$ and ZnO can be used to provide the highly efficient laser articles.

The increase in fluorescent activity, when compared to the host glasses of the Redman patent, is generally at least about 50 percent and preferably around 60 or 70 percent, the increase being at least 50 percent when compared to the working examples of the Redman patent.

There is no mention of any glass system other than that of a glass host composition consisting essentially of tellurium oxide and zinc oxide in the Redman patent. There is no suggestion in the Tedman patent that such highly efficient laser articles can be made from a laser glass host composition containing only certain molar proportions of $TeO_2$, $Li_2O$ and ZnO.

The outstanding laser glass host compositions of the present invention generally contain about 60–85 mole percent $TeO_2$, about 2–20 mole percent $Li_2O$ and about 5–35 mole percent ZnO. As previously indicated, a host glass contains an effective lasing amount of $Nd_2O_3$, which is generally about 0.01–1.5 mole percent and preferably about 0.5–1.2 percent.

Preferred compositions are those in which the glass host comprises about 79–81 mole percent $TeO_2$, about 4–6 mole percent $Li_2O$ and about 14–16 mole percent ZnO. Specific glass compositions that provide excellent results are those, for example, in which the host glass comprises about 80 mole percent $TeO_2$, about 6 mole percent $Li_2O$ and about 14 mole percent ZnO; or a glass that comprises about 79 mole percent $TeO_2$, about 6 mole percent $Li_2O$ and about 15 mole percent ZnO.

In accordance with the present invention, the increase in fluorescent activity for the laser glass articles of the present invention is surprisingly at least about 50 percent over that of a zinc tellurite glass containing 65 mole percent $TeO_2$ and 35 mole percent ZnO and at least 50 percent over that of a lithia-calcia-alumino silicate glass laser rod containing the following ingredients in approximate mole percentages:

| Ingredient | Mole Percent |
|---|---|
| $SiO_2$ | 60 |
| $Al_2O_3$ | 2.5 |
| $Li_2O$ | 27.5 |
| CaO | 10 |
| $Nd_2O_3$ | 0.5 |

The above glass laser composition is set forth in U.S. Pat. No. 3,471,409 to Lee and Rapp.

Generally, the highest fluorescent intensity value for a zinc tellurite glass as above-described containing 35 mole percent ZnO, is about 2.09, and the highest fluorescent intensity value of the above-described lithia-calcia-alumino silicate glass laser, which is the reference laser glass, is held to be 1.0.

The following examples are intended to illustrate the present invention and not to limit the same in any way.

EXAMPLE 1

PART A

A 15 gram melt was prepared by mixing reagent grade raw materials, in the following molar percent and also for convenience, weight percent, with 30 ml. of water.

| Ingredients | Mole Percent | | Weight Percent | |
|---|---|---|---|---|
| | Host Glass | Laser Article | Host Glass | Laser Article |
| $TeO_2$ | 80.0 | 79.6 | 90.4 | 88.9 |
| ZnO | 15.0 | 14.8 | 8.6 | 8.4 |
| $Li_2O$ | 5.0 | 4.9 | 1.0 | 1.0 |
| $Nd_2O_3$ | — | 0.7 | — | 1.7 |

The slurry was mixed for 10 minutes and poured into a gold crucible. The crucible was placed in an air circulating oven with the temperature maintained at 110° C. overnight to remove the water. The crucible was then placed in an electric resistance furnace with the temperature at 750° C. for 3 hours, or until homogenous, after which the molten glass immediately poured into a preheated (260° C.) graphite mold forming a disc having an 11/16 inch diameter and ¼ inch thickness. The graphite mold was placed in an annealing oven maintained at 340° C. After 1 hour, at 340° C., the temperature of the annealing oven was lowered at a rate of 38° C. per hour to 250° C. after which the annealing oven was turned off and the mold cooled to room temperature.

The solid, annealed glass disc was removed from the mold, wet ground and polished with close tolerance to a thickness of 0.195 inches and a diameter of 0.687 inches. The refractive index of the finished polished glass disc was measured to be 2.14.

PART B

The polished glass disc from Part A was tested for fluorescence intensity and decay time in a high power pulsed test system. The disc was placed in a holder and exposed to a beam of light from an EG & G model FX 12-25 xenon flash lamp. The flash lamp had a flash duration of about 20 microseconds. The disc was not observed to solarize after repeated excitation by the flash lamp. The fluorescence intensity and decay time of the excited sample was measured by photographing the oscilloscope display of the 1060 nanometer fluorescent intensity versus time on a Tektronix Model 556, Dual Trace oscilloscope connected to an RCA S-1 photomultiplier, having a narrow band pass filter.

The fluorescence intensity measurement was normalized against ED-2, a glass laser composition of Owens-Illinois, Inc., comprising, in mole percent, 60.0 percent $SiO_2$, 2.5 percent $Al_2O_3$, 27.5 percent $Li_2O$, 10 percent CaO, 0.16 percent $CeO_2$ and 0.5 percent $Nd_2O_3$, disclosed in U.S. Pat. No. 3,471,409, as Example 1. The fluorescence intensity was found to be 3.40 when normalized against the glass laser composition; 3.40 times the intensity of the glass laser composition.

The fluorescence intensity was corrected for the refractive indices of the glass disc and the reference glass laser composition by $$FI \text{ (corrected)} = FI \text{ (normalized)} [(1.56)^2/(\eta \text{ glass disc})^2]$$

The corrected fluorescence intensity was 1.76. The fluorescence decay time was 150 microseconds.

EXAMPLE 2

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 75.0 | 74.6 | 88.8 | 87.4 |
| ZnO | 15.0 | 14.8 | 9.0 | 8.8 |
| $Li_2O$ | 10.0 | 9.9 | 2.2 | 2.1 |
| $Nd_2O_3$ | — | 0.7 | — | 1.7 |

The refractive index of the finished polished glass disc was measured to be 2.06.

PART B

The polished glass disc from Part A was tested for fluorescence intensity and decay time as described in Part B of Example 1. The normalized fluorescence intensity was 3.13 and the corrected fluorescence intensity was 1.75. The fluorescence decay time was 160 microseconds.

EXAMPLE 3

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 70.0 | 69.6 | 86.1 | 83.8 |
| ZnO | 20.0 | 19.8 | 11.8 | 12.2 |
| $Li_2O$ | 10.0 | 9.9 | 2.1 | 2.2 |
| $Nd_2O_3$ | — | 0.7 | — | 1.8 |

The refractive index of the finished polished glass disc was measured to be 2.04.

PART B

The polished glass disc from Part A was tested for fluorescence intensity and decay time as described in Part B of Example 1. The normalized fluorescence intensity was 2.57 and the corrected fluorescence intensity was 1.46. The fluorescence decay time was 156 microseconds.

EXAMPLE 4

PART A

A 15 gram melt was prepared and polished glass discs prepared therefrom as described in Part A of Example 1, except the molar or weight percentages of the raw materials were as follows:

| Ingredients | Mole Percent | | Weight Percent | |
|---|---|---|---|---|
| | Host Glass | Laser Article | Host Glass | Laser Article |
| $TeO_2$ | 65.0 | 64.6 | 81.7 | 80.2 |
| ZnO | 25.0 | 24.8 | 16.6 | 15.7 |
| | 10.0 | 9.9 | 2.3 | 2.3 |
| | — | 0.7 | — | 1.8 |

The refractive index of the finished polished glass disc was measured to be 2.02.

PART B

The polished glass disc from Part A was tested for fluorescence intensity and decay time as described in Part B of Example 1. The normalized fluorescence intensity was 2.77 and the corrected fluorescence intensity was 1.61. The fluorescence decay time was 165 microseconds.

Other specific glass laser compositions set forth herein as being suitable for use in the present invention can be substituted for the particular glass laser compositions used in the working examples to provide substantially equivalent results. For instance, any of the compositions set forth within the area formed by the heavy lines connecting the points ABCDEF of the ternary diagram can be used in place of the specific laser glass compositions used in the working examples to provide an increased efficiency of at least about 50 percent when compared to the glass compositions of the Redman patent and at least about 50 percent or more when compared to the working examples of the Redman patent.

What is claimed is:

1. A laser glass composition comprising $TeO_2$, $Li_2O$ and ZnO in which the proportions of $TeO_2$, $Li_2O$ and ZnO in molar amounts are defined by the area within the heavy lines connecting the points A, B, C, D, E, F of the ternary diagram of the FIGURE of the drawings, the laser glass composition including an effective lasing amount of $Nd_2O_3$.

2. A laser glass composition as defined in claim 1 in which the proportions of $TeO_2$, $Li_2O$ and ZnO are defined by the area within the heavy lines connecting points G, H, I, J, K, L in the ternary diagram of the FIGURE of the drawings.

3. A laser glass composition comprising:
   1. a host glass containing about 60–85 mole percent $TeO_2$, about 2–20 mole percent $Li_2O$, and about 5–35 mole percent ZnO; and
   2. an effective lasing amount of $Nd_2O_3$.

4. A laser glass host composition comprising about 79–81 mole percent $TeO_2$, about 4–6 mole percent $Li_2O$, and about 14–16 mole percent ZnO, the host composition containing about 0.01–1.5 mole percent $Nd_2O_3$.

5. A laser glass composition as defined in claim 3 in which the host glass comprises about 80 mole percent $TeO_2$, about 6 mole percent $Li_2O$, and about 14 mole percent ZnO.

6. A laser glass composition as defined in claim 3 in which the glass host comprises about 81 mole percent $TeO_2$, about 5 mole percent $Li_2O$, and 14 mole percent ZnO.

7. A laser glass composition as defined in claim 3 in which the glass host comprises about 79 mole percent $TeO_2$, about 6 mole percent $Li_2O$, and about 15 mole percent ZnO.

8. A method for making a glass laser article such as a rod, disc, and the like, the method comprising the steps of:
   1. melting laser glass batch-forming materials to provide a molten glass comprising $TeO_2$, $Li_2O$ and ZnO in which the proportions thereof in molar amounts are defined by the area within the heavy lines connecting points A, B, C, D, E, F of the ternary diagram of the FIGURE of the drawings, and an effective lasing amount of $Nd_2O_3$;
   2. forming a glass blank from the molten glass; and
   3. fabricating a laser article from the glass blank, the article having increased lasing efficiency.

9. A method as defined in claim 8 in which the glass comprising $TeO_2$, $Li_2O$ and ZnO has amounts of $TeO_2$, $Li_2O$ and ZnO that are defined by the area within the lines connecting the points G, H, I, J, K, L of the ternary diagram of the FIGURE of the drawings.

10. The new use for a glass composition as a glass laser article in which the glass comprises $TeO_2$, $Li_2O$ and ZnO in which the proportions thereof in molar amounts are defined within the area A, B, C, D, E, F formed by the heavy lines of the ternary diagram in the FIGURE of the drawings, and which glass composition is a host for an effective lasing amount of $Nd_2O_3$, the new use comprising the steps of:
   1. forming a glass laser article from the glass composition;
   2. pumping the laser article to provide an energy inversion; and
   3. lasing the pumped laser article.

11. A glass article made from the composition defined in claim 1.

12. A glass laser article made from the composition defined in claim 1, in the form of a rod.

13. A glass laser article made from the composition defined in claim 1, in the form of a disc.

14. A glass laser article made according to the method defined in claim 8.

* * * * *